United States Patent [19]

Taira

[11] 4,413,889
[45] Nov. 8, 1983

[54] FOCUSING DEVICE FOR MICROSCOPES

[75] Inventor: Akio Taira, Hachiouji, Japan

[73] Assignee: Olympus Optical Co., Ltd., Tokyo, Japan

[21] Appl. No.: 283,198

[22] Filed: Jul. 14, 1981

[30] Foreign Application Priority Data

Jul. 17, 1980 [JP] Japan .......................... 55-100814[U]

[51] Int. Cl.³ .......................................... G02B 7/00
[52] U.S. Cl. .................................. 350/501; 350/521
[58] Field of Search ............... 350/501, 502, 518, 521, 350/522, 530, 563, 564, 273, 274, 449, 450; 354/195

[56] References Cited

FOREIGN PATENT DOCUMENTS 53-27439  3/1978  Japan .................................. 350/518

OTHER PUBLICATIONS

Burcher et al., "Quasi-Microscope Concept for Planetary Missions: Stereo", *Applied Optics,* vol. 17, No. 14, pp. 2130-2132, Jul. 1978.

*Primary Examiner*—William L. Sikes
*Assistant Examiner*—Matthew W. Koren
*Attorney, Agent, or Firm*—Cushman, Darby & Cushman

[57] ABSTRACT

A focusing device for microscopes provided with a light shielding plate having an aperture extending from the center to the outer edge and rotatable around an optical axis in the position of an exit pupil of an objective lens or its conjugate image in order to be able to make focusing accurately even in the case of using an objective lens of any magnification.

6 Claims, 6 Drawing Figures

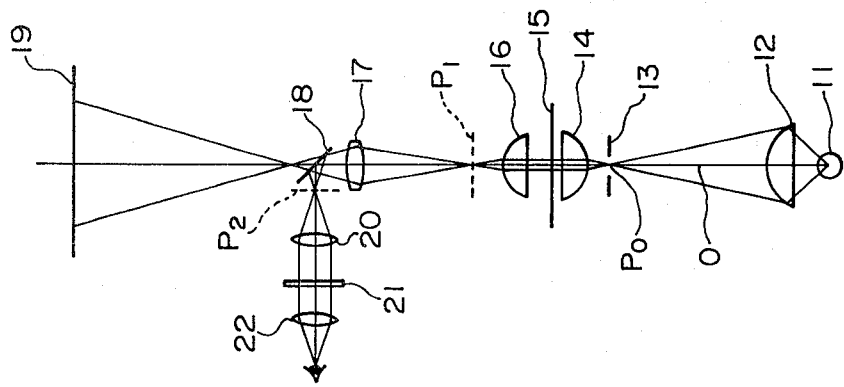
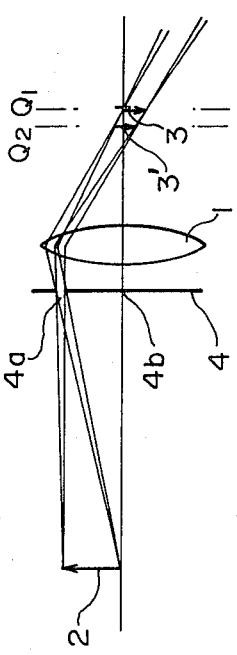
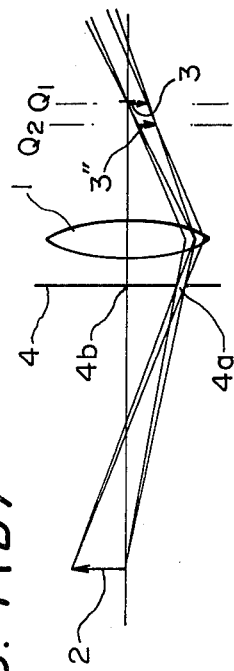

FOCUSING DEVICE FOR MICROSCOPES

BACKGROUND OF THE INVENTION (a) Field of the Invention:

This invention relates to improvements in a focusing device for microscopes.

(b) Description of the Prior Art:

In an objective lens of a microscope, in the case of a high magnification, the depth of focus will be so shallow that, if the objective lens is focused during the observation through an eyepiece, the focusing will be comparatively accurate. On the other hand, in the case of such low magnification as about 4 times as large, the depth of focus will be deeper than in the objective lens of a high magnification and therefore, even if the focusing is not accurate, an object image observed through the eyepiece will be able to be favorably observed by the adjusting action of the naked eye. However, in case it is photographed with a photographing device, the obtained photograph will not be favorable and will be often out of focus. In order to eliminate such defects, there is a method wherein an auxiliary telescope is added to magnify and focus the image. However, in this method, the operation is difficult and the precision is little improved. There is another method wherein the image is focused by locating a position in which no parallax with the focusing glass is produced by vibrating the eye of the observer in the plane vertical to the optical axis. This method is also hard to generally use and is not so recommendable.

FIG. 1 is a principle view for explaining the above mentioned latter method. In the drawing, the reference numeral 1 denotes an objective lens, 2 denotes an object to be observed, 3 denotes an object image and 4 denotes a light shielding plate having a pinhole 4a and arranged in front of the objective lens 1 so as to be rotatable around an axis 4b coinciding with the optical axis. The image 3 of the object 2 is formed through the pinhole 4a. In this case, in a focused plane $Q_1$, even when the pinhole 4a is above the optical axis as shown in (A) and is below it as shown in (B) in FIG. 1, the image 3 will be formed in exactly the same position but, in a plane $Q_2$ out of focus, an image 3' in the case shown in (A) and an image 3" in the case shown in (B) will be formed in different positions. Therefore, if the image position is adjusted so as not to shift even if the light shielding plate 4 is rotated, the focusing of the lens 1 will be adjusted to be correct.

A microscopic photographing device using such focus detecting device shall be explained in the following. FIG. 2 shows an example of an optical system of such microscopic photographing device. The reference numeral 11 denotes a light source, 12 denotes a collector lens, 13 denotes an aperture diaphragm of an illuminating system located in a pupil position $P_0$ of the optical system, 14 denotes a condenser lens, 15 denotes a sample, 16 denotes an objective lens, 17 denotes an eyepiece, 18 denotes a beam splitter, 19 denotes a film surface, 20 denotes a relay lens, 21 denotes a reticle and 22 denotes a viewer. In such microscopic photographing device, such light shielding plate 23 having a pinhole 23a as is shown in FIG. 3 is arranged near any of the pupil position $P_0$ of the objective lens 16 and its conjugate positions $P_1$ and $P_2$ so that its center may coincide with the optical axis and is rotated to focus the image.

In such conventional focusing device as is described in the above, there are disadvantages that, in case the magnification of the objective lens varies, with the variation of the size of the pupil, the pinhole 23a will be out of the pupil and the focusing will not be able to be made.

SUMMARY OF THE INVENTION

Therefore, a primary object of the present invention is to provide a focusing device for microscopes wherein, even in case the magnification of the objective lens to be used varies and the size of the pupil varies, the detection will be possible.

According to the present invention, this object is attained by providing a light shielding plate having an aperture extending from the center to the outer edge.

According to a preferred formation, the aperture is formed to be sector-shaped or rectangular.

BRIEF DESCRIPTION OF THE DRAWINGS

FIG. 1 is a view for explaining the principle of a focusing method;

FIG. 2 is a view showing an optical system of a microscopic photographing device adopting the focusing method shown in FIG. 1;

DESCRIPTION OF THE PREFERRED EMBODIMENTS

Figure 3:
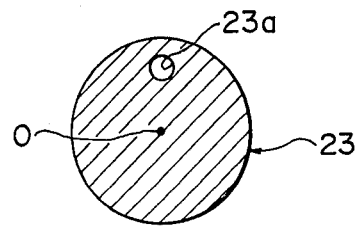
FIG. 3 is an elevational view of a light shielding plate used for conventional focusing devices.
Figure 4:
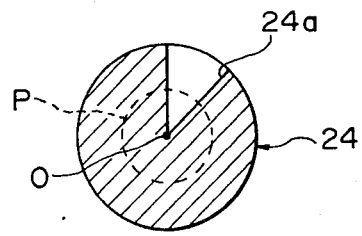
FIGS. 4 and 5 are respectively elevational views of embodiments different from each other of light shielding plates used for focusing devices according to the present invention.

The contents of the focusing device of the present invention shall be explained in the following on the basis of the embodiments. In the focusing device of the present invention, the formation of the optical system is the same as in the conventional example and therefore shall not be explained. In the optical system of the same formation as in the conventional example shown in FIG. 2, such structure as is shown in FIG. 4 is used for the light shielding plate to be used, instead of that of the conventional example shown in FIG. 3. That is to say, in a light shielding plate 24 according to the present invention, an aperture 24a expanding in the form of a sector from its center and extending to the outer edge is formed. The same as in the conventional device, the light shielding plate 24 is arranged in the position of the pupil of the objective lens or the position conjugate with it on the optical axis so as to rotate with the point 0 as center. Focusing is made in the same manner as in the case of the already explained conventional device. According to this light shielding plate 24, as the aperture 24a extends from the center to the outer edge, even in case the diameter of the pupil P is small, focusing can be made without question.

Figure 5:
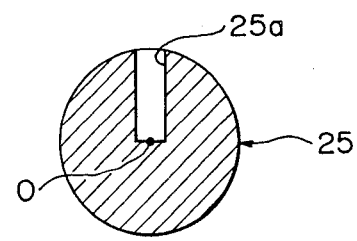

FIG. 5 shows another embodiment of the present invention. In this embodiment, the aperture extends rectangularly in the radial direction of a light shielding plate. That is to say, the light shielding plate 25 has a long aperture 25a having a substantially equal width extending from the rotation center to the outer edge. If such light shielding plate 25 is used as set in the position of a pupil of an objective lens or the position conjugate with it in the same manner as in the above described case, focusing will be able to be made irrespective of the size of the pupil.

I claim:

1. A focusing device for microscopes comprising a light shielding plate arranged in the position of an exit pupil of an objective lens and rotatable concentrically with the optical axis of said objective lens and having therein an aperture extending from the center to the outer edge thereof, focusing being made by observing whether the image position of an object shifts or not when said light shielding plate is rotated.

2. A focusing device for microscopes according to claim 1 wherein said aperture is in the form of a sector expanding from the center toward the outer edge of said light shielding plate.

3. A focusing device for microscopes according to claim 1 wherein said aperture is in the form of a rectangle extending radially from the center to the outer edge of said light shielding plate.

4. A focusing device for microscopes comprising a light shielding plate arranged in the position conjugate with an exit pupil of an objective lens and rotatable concentrically with the optical axis of an optical system for forming a conjugate image of said exit pupil and having therein an aperture extending from the center to the outer edge thereof, focusing being made by observing whether the image position of an object shifts or not when said light shielding plate is rotated.

5. A focusing device for microscopes according to claim 4 wherein said aperture is in the form of a sector expanding from the center toward the outer edge of said light shielding plate.

6. A focusing device for microscopes according to claim 4 wherein said aperture is in the form of a rectangle extending radially from the center to the outer edge of said light shielding plate.

* * * * *